March 1, 1927. 1,619,301
R. J. LEARY
CHARGING APPARATUS FOR MOLDING MACHINES
Filed June 12, 1925 2 Sheets-Sheet 1
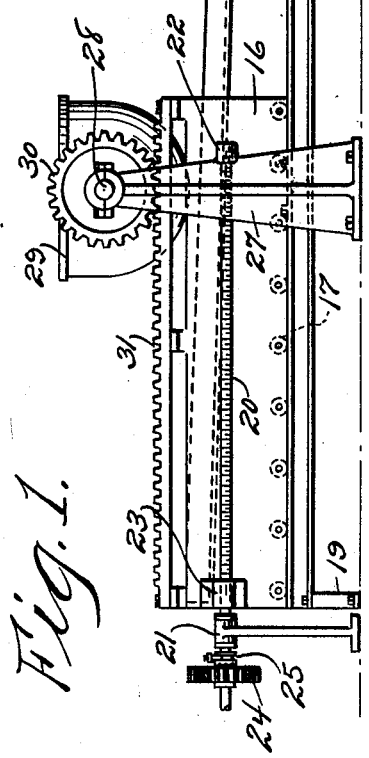
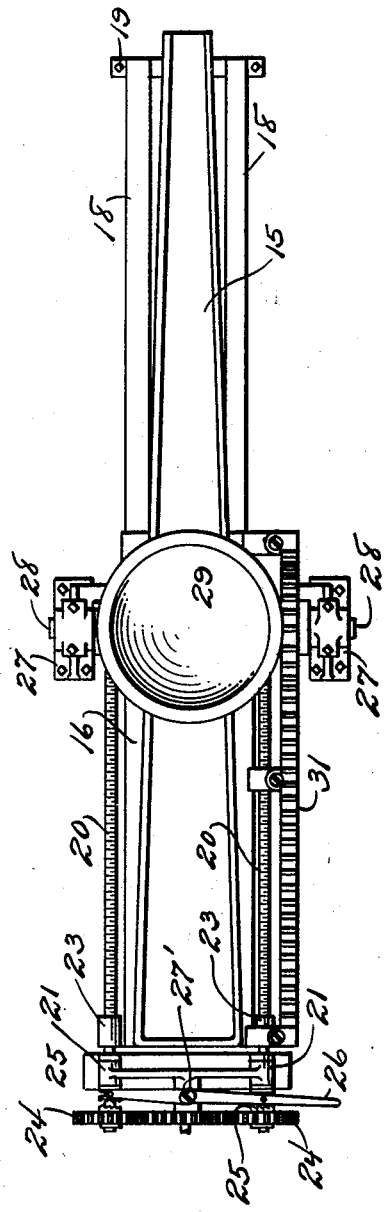
Richard J. Leary
INVENTOR
BY Victor J. Evans
ATTORNEY
WITNESS

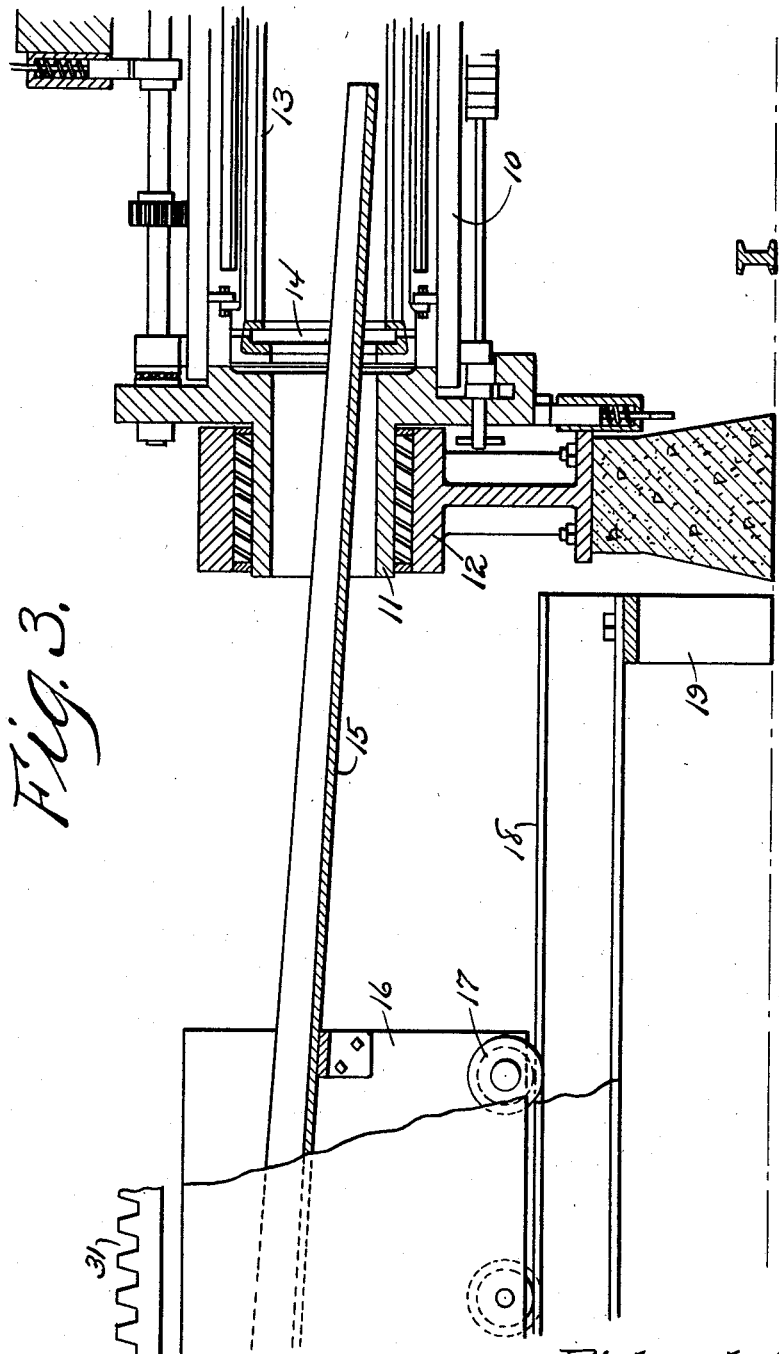

Patented Mar. 1, 1927.

1,619,301

UNITED STATES PATENT OFFICE.

RICHARD J. LEARY, OF BURLINGTON, NEW JERSEY.

CHARGING APPARATUS FOR MOLDING MACHINES.

Application filed June 12, 1925. Serial No. 36,693.

This invention relates to charging apparatus for molding machines as disclosed in my co-pending application, filed December 12, 1924, and bearing the Serial No. 755,533.

An object of the present invention is to provide a charging apparatus which is especially adapted for pipe or like molding machines, whereby a charge of molten metal or the like, may be properly distributed within the mold.

With the above and other objects in view, the invention further includes the following novel features and details of construction, to be hereinafter more fully described, illustrated in the accompanying drawings and pointed out in the appended claims.

In the drawings:—

Figure 1 is a side elevation of a charging apparatus constructed in accordance with the invention.

Figure 2 is a plan view of the same.

Figure 3 is a fragmentary sectional view taken longitudinally through one end of the charging apparatus and showing a portion of a pipe molding machine.

For the purpose of illustrating the apparatus, it is shown in connection with a portion of a centrifugal pipe molding machine which forms the subject matter of the co-pending application above referred to, but it is of course apparent that the apparatus may be used in connection with other types of machines and it is not the purpose of the present application to limit the invention to the particular character of molding machine illustrated.

Referring in detail to the drawings wherein like characters of reference denote corresponding parts, the molding machine comprises a cylindrical casing 10 which is preferably longitudinally split and which is supported by hollow bearing sleeves 11, rotatable in bearings 12 at each end of the machine, only one of the sleeves 11 and bearings 12 being shown. The machine is provided with a lining 13 within which the molten metal is placed, while a hollow core 14 is located at each end of the lining for forming the flanges of a pipe.

The charging apparatus comprises a trough 15 which is open at one end and which extends downwardly and tapers toward this open end. One end of the trough is mounted within a carriage 16 which is supported by rollers 17 upon tracks 18. The tracks are suitably supported as indicated at 19 adjacent the feed end of the mold and the height of the trough is such that when the carriage is moved in one direction the trough will enter the mold as shown in Figure 3 of the drawings.

In order to operate the carriage there is provided upon opposite sides shafts 20. These shafts are reversely threaded and are mounted in bearings 21 and 22. The carriage has extending from each side thereof an internally threaded nut 23 and these nuts are engaged by the shafts 20, rotation of one shaft moving the trough in one direction, while rotation of the other shaft will move the trough in an opposite direction, due to the reverse arrangement of the threads of the shafts.

Motion is imparted to the threaded shafts 20 by gears 24 which are loose upon said shafts and which are adapted to be locked to the shafts by clutches 25. These clutches are simultaneously operated by means of a lever 26 which is pivotally mounted as shown at 27'. By moving the lever in one direction, one of the gears 24 will be locked to its shaft and the gear of the other shaft released, while pivotal movement of the lever in an opposite direction will release the fast gear and lock the free gear. Direction of movement of the trough may thus be controlled.

The bearings 22 are mounted upon standards 27 provided at each side of the track 18. These standards also provide bearings for trunnions 28 which rotatably support a ladle 29. One of the trunnions 28 has secured thereon a gear 30 which engages a rack bar 31 secured to one side of the carriage 16. Thus, when the carriage is moved horizontally the ladle will be rotated.

In charging the mold, the lever 26 is operated to lock the gear 24 to the threaded shaft 20 which moves the carriage in a direction to cause the trough 15 to enter the mold. During this movement, the ladle 29 is rotated, but when the trough reaches its proper limit of inward movement within the mold, the ladle will be in an upright position, so that a proper quantity of molten metal may be placed therein. The lever 26 is now operated to release the threaded shaft mentioned and lock the gear to the other threaded shaft. Movement of the trough in a reverse direction will now occur. During the outward movement of the trough the ladle will be tilted so that the contents of said ladle will be deposited within the trough and will pass into the bottom of the mold, rotation of the ladle continuing until the inner end of the trough traverses the length of the mold, so that the metal will be distributed throughout said length. Operation of the mold will then distribute the metal throughout the inner wall of the lining as set forth in the before mentioned application.

The invention is susceptible of various changes in its form, proportions and minor details of construction and the right is herein reserved to make such changes as properly fall within the scope of the appended claims.

Having described the invention what is claimed is:—

1. In a mold charging apparatus, a carriage adapted to be located adjacent a mold, a trough open at its outer end and included in the carriage, means whereby the carriage may be operated to project one end of the trough within the mold and means controlled by the movement of the carriage for delivering molten metal to the trough during the outward movement of the latter, whereby the metal will be distributed throughout the mold during such movement.

2. In a mold charging apparatus, a carriage adapted to be located adjacent a mold, a trough included in the carriage, means whereby the carriage may be operated to project one end of the trough within the mold, a ladle mounted for movement above the carriage and means controlled by the movement of the carriage for operating the ladle to transfer its contents to the trough during the outward movement of the latter.

3. In a mold charging apparatus, a carriage adapted to be located adjacent a mold, a trough included in the carriage, means whereby the carriage may be operated to project one end of the trough within the mold, a ladle mounted for rotary movement above and in a direction longitudinally of the trough and means controlled by the movement of the carriage for rotating the ladle to transfer its contents to the trough during the outward movement of the latter and distribute the material to the mold during such movement.

4. In a mold charging apparatus, a carriage, a trough supported by the carriage, rotatably mounted threaded shafts upon opposite sides of the carriage and operatively associated with the latter to move the carriage in opposite directions, whereby the trough may be inserted into and withdrawn from a mold, means whereby the shafts may be selectively operated to control the direction of movement of the carriage and means for supplying molten metal to the trough.

5. In a charging apparatus, a trough open at its outer end mounted for horizontal movement, means whereby the trough may be moved horizontally in opposite directions and means operated by the trough moving means when said trough is moved in one direction to supply material to the trough to distribute the material during such movement.

In testimony whereof I affix my signature.

RICHARD J. LEARY.